(12) United States Patent
Usami et al.

(10) Patent No.: US 7,900,535 B2
(45) Date of Patent: Mar. 8, 2011

(54) TRANSMISSION

(75) Inventors: Seiji Usami, Chiryu (JP); Takafumi Yamada, Nishio (JP); Yasuhiro Nitta, Nagoya (JP); Akihiko Ikeda, Toyota (JP); Shinji Ogawa, Nishikamo-gun (JP)

(73) Assignees: Aisin AI Co., Ltd., Nishio-Shi, Aichi-Ken (JP); Toyota Jidosha Kabushiki Kaisha, Toyota-Shi, Aichi-Ken (JP)

(*) Notice: Subject to any disclaimer, the term of this patent is extended or adjusted under 35 U.S.C. 154(b) by 486 days.

(21) Appl. No.: 11/357,106

(22) Filed: Feb. 21, 2006

(65) Prior Publication Data

US 2006/0189434 A1    Aug. 24, 2006

(30) Foreign Application Priority Data

Feb. 21, 2005   (JP) ................................. 2005-044603

(51) Int. Cl.
*F16H 57/04*    (2010.01)
(52) U.S. Cl. ........ 74/606 R; 184/6.5; 184/6.12; 184/11.1
(58) Field of Classification Search .................... 74/467, 74/606 R, 606 A; 184/106, 6.21–6.25, 6.12, 184/6.2, 11.1
See application file for complete search history.

(56) References Cited

U.S. PATENT DOCUMENTS

| 1,220,810 | A | * | 3/1917 | Alquist ................... 184/6.12 |
| 1,338,310 | A | * | 4/1920 | Lawrance .................. 184/6.6 |
| 1,442,789 | A | * | 1/1923 | Stehlin ................... 184/13.1 |
| 1,483,830 | A | * | 2/1924 | Moore .................... 184/11.1 |
| 1,673,566 | A | * | 6/1928 | Himes .................... 184/11.1 |
| 2,085,814 | A | * | 7/1937 | Matthews et al. ............ 184/6.12 |
| 2,207,935 | A | * | 7/1940 | Naab ....................... 184/5 |
| 2,676,671 | A | * | 4/1954 | Schmitter ................. 184/11.1 |
| 3,189,126 | A | * | 6/1965 | May ....................... 184/6.2 |
| 3,529,698 | A | * | 9/1970 | Nelson .................... 184/6.12 |
| 3,847,249 | A | * | 11/1974 | Oehring .................. 184/6.12 |
| 4,134,380 | A | * | 1/1979 | Niwa et al. ............ 123/142.5 R |
| 4,222,283 | A |   | 9/1980 | Nagy |

(Continued)

FOREIGN PATENT DOCUMENTS

FR          2 613 015         9/1988

(Continued)

OTHER PUBLICATIONS

Official Letter issued Aug. 10, 2009 in corresponding German Application No. 10 2006 000 080.3 and English translation of Official Letter.

(Continued)

*Primary Examiner* — Richard W Ridley
*Assistant Examiner* — Thomas Diaz
(74) *Attorney, Agent, or Firm* — Buchanan Ingersoll & Rooney PC

(57) ABSTRACT

A transmission includes: a casing of the transmission; a shaft rotatably supported by the casing and having an oil passage; plural gears mounted on the shaft. The lubricant is partly lifted and stirred in response to a shift operation implemented by selectively engaging and rotating the gears. The transmission further includes a lubricating mechanism placed at a position higher than the shaft and having an upper end opening in an upward direction so as to collect and store the lifted lubricant. The lubricating mechanism is provided with an oil supply port through which the lubricant is guided to the oil passage of the shaft.

9 Claims, 2 Drawing Sheets

U.S. PATENT DOCUMENTS

| | | | |
|---|---|---|---|
| 4,231,266 A * | 11/1980 | Nishikawa et al. | 74/467 |
| 4,242,923 A * | 1/1981 | Nishikawa et al. | 475/160 |
| 4,347,756 A * | 9/1982 | Sogo | 74/467 |
| 4,480,493 A * | 11/1984 | Takahashi | 74/467 |
| 4,644,815 A * | 2/1987 | Kawano et al. | 74/467 |
| 4,987,974 A | 1/1991 | Crouch | |
| 5,130,014 A * | 7/1992 | Volz | 210/130 |
| 6,109,393 A * | 8/2000 | Toyota et al. | 184/6.12 |
| 6,223,858 B1 * | 5/2001 | Ubagai et al. | 184/11.2 |
| 6,318,501 B1 | 11/2001 | Udou et al. | |
| 6,488,844 B2 * | 12/2002 | Willis et al. | 210/172.2 |

FOREIGN PATENT DOCUMENTS

| | | |
|---|---|---|
| JP | 60-123456 U | 8/1985 |
| JP | 61-017768 A | 1/1986 |
| JP | 5-39839 A | 2/1993 |
| JP | 2003-269586 A | 9/2003 |
| JP | 2004-100741 A | 4/2004 |
| KR | 2001-0066663 A | 7/2001 |
| UA | 2 041 117 A | 9/1980 |

OTHER PUBLICATIONS

Japanese Office Action issued in the corresponding Japanese Patent Application No. 2005-044603.

* cited by examiner

TRANSMISSION

CROSS REFERENCE TO RELATED APPLICATIONS

This application is based on and claims priority under 35 U.S.C. §119 with respect to Japanese Patent Application 2005-044603, filed on Feb. 21, 2005, the entire content of which is incorporated herein by reference.

FIELD OF THE INVENTION

This invention generally relates to a transmission for a vehicle. More particularly, this invention pertains to a lubricating mechanism for use in a transmission of a vehicle.

BACKGROUND

Vehicles, which are driven by a driving power source such as an internal combustion engine and a motor as a non-limiting example, are respectively provided with a transmission that serves inter alia to generate a speed and driving force of a vehicle corresponding to road conditions. In such transmission, plural gears mounted on an input shaft and an output shaft are operatively selected and gear-meshed in such a manner that a driving force is transmitted at a predetermined gear ratio respectively designed for each shift stage. Such transmission is in general provided with a lubricating mechanism, which is configured to store a lubricant in a transmission casing and to circulate for lubrication, for the purpose of lubricating gear-meshed portions and sliding portions and of restraining depression of the transmission, the depression which may occur due to friction.

In order to exert lubrication by this type of conventional lubricating mechanism, lubricating oil, which is resident at a bottom portion of the transmission casing, is lifted, spattered and supplied to mechanical portions to be lubricated, in response to gear rotation. JP2004-100741 (a first gazette) discloses a lubricating mechanism for a transmission as one of measures for adequate lubrication. The lubricating mechanism disclosed in this first gazette includes: an oil reservoir for storing lubricating oil lifted by gear rotation; and an axial-directional oil passage and radial-directional oil passages of a counter shaft. The radial-directional oil passages communicate with the axial-directional oil passage. The lubricating mechanism further includes a spouted oil receiver for collecting or receiving the lubricating oil stored in the oil reservoir. According to this type of lubricating mechanism, the lubricating oil, which was lifted in response to gear rotation, is partly guided from the oil receiver to the axial-directional oil passage of the counter shaft through the oil reservoir. The lubricating oil guided to the axial-directional oil passage is then supplied to a bottom surface of each gear through the radial-directional oil passages under the favor of a centrifugal force of the counter shaft. As described above, the lubricating oil can be therefore supplied to each gear from a radially inner side of the gear as well as from a radially exterior side thereof, which enables to enhance a performance of lubrication.

Meanwhile, losses stemming from fluid resistance, which may occur upon lifting lubricating oil in response to gear rotation, i.e., agitation loss is considered as one of factors which hinder high-speed rotation of an output shaft of a transmission. In the light of the foregoing, JP2003-269586 discloses a lubrication unit for a transmission, the lubrication unit which includes an oil separator that is attached to a bottom portion of a transmission casing and defines an oil tank. When an output shaft of the transmission rotates at a high rotational speed, lubricating oil is guided to the oil tank and an amount of oil to be stirred by gears is then reduced. Therefore, it is possible to reduce a degree of agitation loss.

In conventional lubricating mechanisms such as the above-descriptions, lubricating oil is stored in an oil reservoir located adjacent to a bearing portion of a shaft and is supplied into the shaft. In such case, the oil reservoir is formed by use of a closed space near one end of a shaft, and lubricating oil may on occasions be leaked from clearances between components forming the oil reservoir, which may lower an efficiency of oil supply. Moreover, when there are plural mechanical portions to be supplied with lubricating oil, it may be necessary to provide an oil receiver and an oil reservoir individually. In such case, various problems may occur, such as weight increase due to an increase in the number of components, restraints in a locating space, increase in material cost or assembling hour.

The present invention has been made in view of the above circumstance, and provides a transmission having a lubricating mechanism which is configured with a simple structure, can enhance an efficiency of lubricating oil supply with a simple configuration, requires less restraints in a locating space, and is excellent in terms of weight or manufacturing cost.

SUMMARY

According to an aspect of the present invention, a transmission includes: a casing storing a lubricant therein; a shaft rotatably supported by the casing and having an oil passage; plural gears mounted on the shaft. A shift operation is implemented by selectively engaging the gears. The lubricant, which is stored in the casing, is lifted and stirred in response to gear rotation. The transmission further includes an oil tank placed at a position higher than the shaft and having an upper end opening in an upward direction so as to collect and store the lifted lubricant. The oil tank is provided with an oil supply port through which the lubricant is guided to the oil passage.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
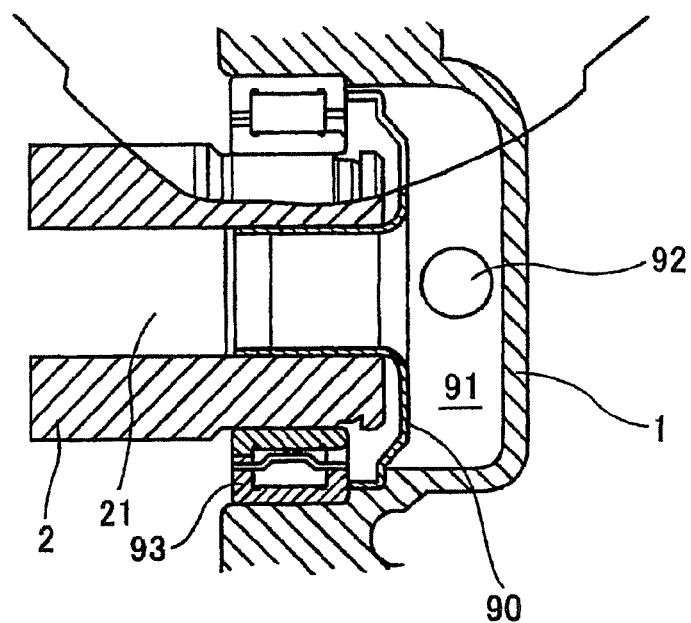
FIG. 1 is a partially cross sectional view illustrating a conventional lubricating mechanism of a transmission.

A bearing portion and vicinity of an input shaft 2 of a conventional transmission is enlarged in FIG. 1. In a conventional manner, as illustrated in FIG. 1, an oil reservoir 91 is formed by a wall 90, which is attached near an axial end of the input shaft 2 and compartmentalizes a space relative to a transmission casing 1. Lubricating oil as lubricant is collected by a tray (not illustrated) and fed into the oil reservoir 91 through an oil supply port 92. The lubricating oil is then supplied to an axial-directional oil passage 21 inside the input shaft 2. In such a configuration for lubrication, the lubricating oil is however leaked from a clearance between the wall 90 and the casing 1 and/or from a clearance between a bearing portion 93 and the casing 1, which on occasions causes deterioration of an efficiency of oil supply.

Figure 2:
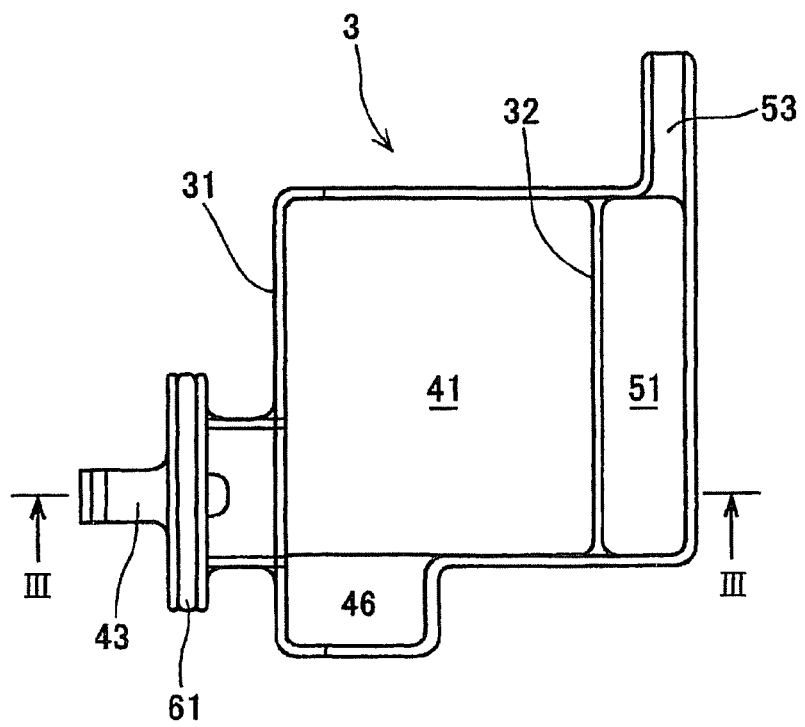
FIG. 2 is an aerial view illustrating an oil tank of a transmission according to an embodiment of the present invention.
Figure 3:
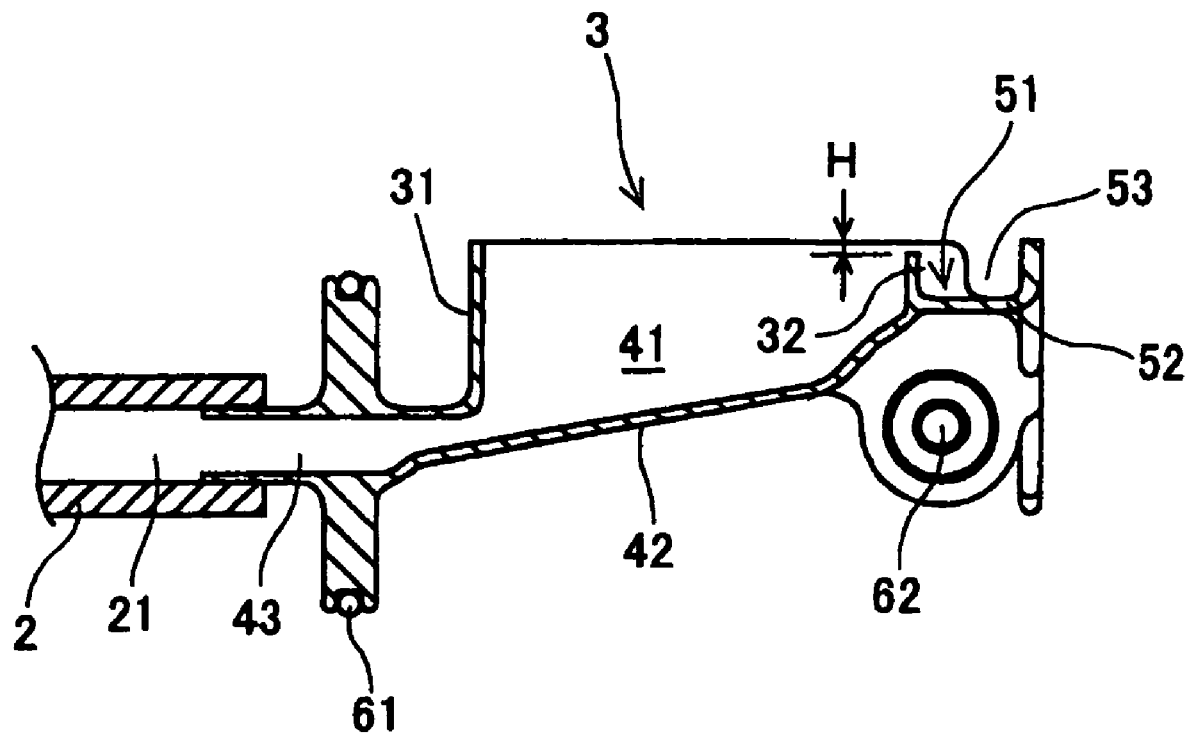
FIG. 3 is a sectional view of the oil tank taken along line III-III in FIG. 2.

As illustrated in FIGS. 2 and 3, a transmission according to the embodiment of the present invention is provided with an oil tank 3 serving as a lubricating mechanism. The oil tank 3 is mainly configured with an approximately rectangle-shaped sidewall 31, at least one partition 32 (a wall) which divides an inside of the side wall 31 at least into a first portion 41 and a second portion 51, a bottom plate 42 of the first portion 41, and a bottom plate 52 of the second portion 51. The oil tank 3 is further configured with an oil supply port 43 and at least one auxiliary oil supply port 53. The oil supply port 43 extends through a portion of the side wall 31, the portion which forms the first portion 41, while the or each auxiliary oil supply port 53 is formed by notching a portion of the side wall 31, the portion which forms the second portion 51.

As is apparent from FIGS. 2 and 3, an upper opening end of the sidewall 31 opens in an upward direction, i.e., in a direction perpendicular to a drawing sheet of FIG. 2, at a fixed height over an entire circumference thereof. A portion of the side wall 31, the portion which forms the first portion 41, extends outwardly, e.g., in a downward direction in FIG. 2, and forms a protrusion 46, which has an upper end opening in an upward direction, in such a manner that an opening area of the first portion 41 is expanded. The partition 32 divides an inside of the oil tank 3 into the first portion 41 and the second portion 51. For example, an opening area of each first and second portion 41 and 51 can be determined on the basis of a required amount of lubricating oil. According to the embodiment of the present invention, a position of the partition 32 in a right-and-left direction in FIG. 2 is determined so as to secure at least a required amount of lubricating oil in the first portion 41. A height of the partition 32 is designed lower, by a length H, than a height of the sidewall 31.

As illustrated in FIG. 3, the bottom plate 42 of the first portion 41 is sloped and a bottom end of the slope reaches the oil supply port 43. The oil supply port 43 is a tube type and communicates with the axial-directional oil passage 21 of the input shaft 2. The bottom plate 52 of the second portion 51 is substantially horizontal and is placed at a position, which is the same as a height of a bottom of the auxiliary oil supply port 53, and which is higher than the bottom plate 42. The auxiliary oil supply port 53 is spouted and communicates with a secondary lubricated object such as a differential mechanism.

The oil tank 3 can be made of, for example a resin which is superior in heat resistance, oil resistance and long-term reliability, and is light-weight and low-cost. As a manufacturing method of the oil tank 3, for example, an integral molding or a combination of molded components can be applicable.

The oil tank 3 is secured at a predetermined position in the transmission by means of fixing members 61 and 62. According to the embodiment of the present invention, the transmission houses the input shaft 2 at an upside therein and an output shaft at a downside therein. Alternatively or in addition, even if a positional relationship of shafts in the transmission is not the same as described above in accordance with changes in an inside structure of the transmission, the present invention can be applied.

Next, described below is an operation of a lubricating mechanism including the oil tank 3 of the transmission according to the embodiment of the present invention.

Once the transmission is activated, gears on the input shaft 2 lift and stir the lubricating oil being resident or stored at the bottom portion inside the casing 1. The stirred lubricating oil is partly supplied to the openings of the oil tank 3 and is collected by the first portion 41 and the second portion 51. Here, an amount of lubricating oil collected by each first and second portion 41 and 51 can be determined on the basis of the opening area of each first and second portion 41 and 51. The first portion 41, which possesses a greater opening area than the one of the second portion 51, can collect a greater amount of lubricating oil than the second portion 51.

According to the embodiment of the present invention, under the favor of gravitation, the lubricating oil collected by the first portion 41 can be supplied to the axial-directional oil passage 21 via the oil supply port 43 from the sloped bottom plate 42. The lubricating oil in the input shaft 2 can be then supplied to bottoms of the gears from radial-directional oil passages (not illustrated), by virtue of centrifugal force. As described above, lubrication can be exerted in the transmission. In the course of collecting of the lubricating oil by the first portion 41, an excess amount of lubricating oil remains inside the first portion 41. Likewise, the lubricating oil collected by the second portion 51 is at first supplied to the secondary lubricated portions through the auxiliary oil supply port 53, without remaining inside the second portion 51. In the course of collecting of the lubricating oil by the second portion 51, however, an excess amount of lubricating oil remains inside the second portion 51.

Each first portion 41 and second portion 51 possesses an opening area that is sufficient to collect a required amount of lubricating oil under the normal operation of the transmission. The lubricating oil can therefore normally remain inside the first portion 41 and/or the second portion 51. When an amount of lubricating oil remaining at one of the first portion 41 and the second portion 51 is increased and the lubricating oil remaining at the one thereof exceeds the height of the partition 32, the lubricating oil remaining at the one thereof flows to the other one thereof. Here, because the height of the partition 32 is lower than the height of the sidewall 31 by the length H, the lubricating oil does not leak out towards the casing 1.

However, some factors such as a degree of inclination of a vehicle, a rotational speed of each gear, and a temperature of lubricating oil, on occasions negatively affect a performance of lifting or stirring of the lubricating oil. In such circumstances, lifting and/or stirring of the lubricating oil may not be exerted temporarily and adequately, and there may be a possibility that one of the first portion 41 and the second portion 51 stores, therein, lubricating oil at an excessive amount, and yet the other one thereof is short of lubricating oil. According to the embodiment of the present invention, however, the lubricating oil can travel back and forth between the first portion 41 and the second portion 51. Therefore, lubrication can be achieved reliably.

As described above, in the transmission, conventional configuration of each of a casing, a shaft and gears can be applied. The oil tank 3, which is configured independently, is employed instead of a conventional oil reservoir that is formed by use of a closed space near an axial end of a shaft. An upper portion of the oil tank 3 is open and serves as a tray for collecting the lifted lubricant. The oil tank 3 is placed at a position higher than the shaft 2 having the axial-directional oil passage 21 therein, and the oil supply port 43, which is provided at a bottom portion of the oil tank 3, is configured to communicate with the axial-directional oil passage of the shaft. Therefore, the lubricant in the oil tank can be guided to the axial-directional oil passage 21 by virtue of gravitation.

There is no restriction in the shaft 2 of the transmission. For example, if a counter shaft is provided with the axial-directional oil passage 21, and the lubricant is supplied to gears mounted on the counter shaft, the lubricant can be supplied, for lubrication, to the gears mounted on an input shaft or an output shaft, the gears which are engaged with the gears of the counter shaft.

The shape of each the oil tank 3 and the opening thereof can be freely designed being confined not to hinder rotation of the shaft 2 and gears of the transmission. Therefore, it is possible for the oil tank 3 to possess an opening area and a volume, which both are sufficient to collect and store a predetermined amount of lubricant. Moreover, in terms of a material of the oil tank 3, it is possible to freely select a material such as resin and metal, in view of heat resistance, long-term reliability and so on.

By employing such oil tank as described above, it is possible to prevent the collected lubricant from being leaked out, thereby enabling to enhance an efficiency of oil supply.

The oil tank 3 can be provided with the auxiliary oil supply port 53 at a different portion from the axial-directional oil passage 21. That is, when there are other portions to be lubricated except for the axial-directional oil passage 21, the oil tank 3, which is a single unit, can be provided with plural oil supply ports. For example, in a transmission for a rear engine rear drive (RR) vehicle, a differential mechanism is on occasions provided in conjunction in a transmission casing. In this case, it is possible to connect an oil passage to the differential mechanism by providing an auxiliary oil supply 53 at the oil tank 3 and to guide the lubricant thereto.

Compared with a conventional lubricating mechanism having a tray and an oil reservoir independently, the oil tank 3, which is provided with the plural oil supply ports, can be configured with the less number of components and can be lightweight. Accordingly, the oil tank 3 described above requires less requirements in a setting space thereof and excels at material cost, assembling hour and so on.

The oil tank 3 can include at least one wall 32 by which an inside of the oil tank is divided into plural portions, each of which possesses the oil supply port 43 or the auxiliary oil supply port 53. The upper end of the wall 32 can be lower in height than the upper end of the oil tank 3. Each divided portion 41 and 51 of the oil tank 3 can have at least one of an opening area and a volume, which both vary in response to a required amount of lubricant.

When the oil tank 3 is provided with both the oil supply port 43 and the auxiliary supply port 53, and if they are not identical in height, there may be a possibility that the lubricant stored in one of the divided portions is supplied only to a lower side, not to a higher side. In the light of the foregoing, in order to reliably supply the lubricant oil to both plural divided portions, the inside of the oil tank 3 can be divided, by the wall 32, to plural portions. Accordingly, each divided portion 41 and 51 can possess the oil supply port 43 or the auxiliary oil supply port 53, and the lubricant can be collected and stored in each divided portion and can be supplied to the oil supply port 43 and the auxiliary oil supply port 53.

The upper end of the wall 32 can be lower in height than the upper opening end of the oil tank 3. Because, when one of the plural divided portions stores the lubricant excessively, the excessive amount of lubricant can flow into the other one of the plural divided portions before running off from the upper opening end of the oil tank 3 towards the casing. Moreover, because lifting and stirring of the lubricant are not uniform, the amount of lubricant to be collected by each divided portion of the oil tank 3 may vary, and a ratio of distributing the lubricant may also vary. Therefore, lubricating performance can be enhanced by allowing the lubricant to travel back and forth between the plural divided portions of the oil tank 3. The enhancement of the lubricating performance can be yielded by the wall 32 that is lower in height than the upper opening end of the oil tank 3, and such enhancement of the lubricating performance can not be yielded simply by lining up plural oil tanks.

The opening area, and the volume, of each divided portion of the oil tank 3 can be determined on the basis of a required amount of lubricant oil.

When the oil tank 3 is provided with plural auxiliary oil supply port, the same or similar effects can be generated by allocating each auxiliary oil supply port for each divided portion of the oil tank.

As described above, according to the transmission provided with the oil tank 3, leakage of the collected lubricant can be avoided and an efficiency of oil supply can be improved. Moreover, the oil tank 3 is provided with at least one wall 32 which divides an inside of the oil tank into plural portions 41 and 51 which respectively possess the oil supply port 43 or the auxiliary oil supply port 53. Therefore, the oil tank 3 can be lightweight with the less number of components, and the oil tank 3 requires fewer restrictions in a setting space thereof. The oil tank 3 further can excel at material cost, assembling hour, and so on. Further, by designing the height of the wall lower than the upper opening end of the oil tank 3, it is possible to allow the lubricant oil travel back and forth between the plural divided portions and to lubricate reliably.

As described above, as far as transmissions are respectively provided with a lubricating mechanism according to which lubricating oil stored in a casing can be circulated, the present invention can be widely applicable regardless of gear configurations, shift operation control methods, and so on.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A transmission comprising:
a rotatably supported shaft rotatable about a longitudinal axis and having an interior longitudinal oil passage, said shaft adapted to partly lift and stir lubricant in response to rotation of the shaft; and
a lubricating mechanism including a lubricant containment structure having an upper end placed at a position higher than the shaft, the upper end opening in an upward direction so as to collect and store the lifted lubricant, the lubricant containment structure including a partition wall having an upper end lower than the upper end of the lubricant containment structure, and extending from a bottom portion of the lubricant containment structure to divide an inside of the lubricant containment structure into plural portions, a lower end of the partition wall disposed above the axis, one of the plural portions possessing an oil supply port through which the lubricant is guided to the oil passage through an end of the shaft, and an other of the plural portions possessing an auxiliary oil supply port through which the lubricant is guided to a region distinct from the oil passage of the shaft, one side of the partition wall arranged to contact lubricant in the one of the plural portions and an other side of the partition wall arranged to contact lubricant in the other of the plural portions to thereby prevent fluid communication between the one portion and the other portion except over the upper end of the partition wall, wherein the oil supply port and the auxiliary oil supply port are non-serially arranged so that the lubricant flows through the oil supply port to the oil passage of the shaft independent of whether lubricant flows through the auxiliary oil supply port to the region distinct from the oil passage of the shaft.

2. A transmission according to claim 1, wherein each of the plural portions of the lubricant containment structure has at least one of an opening area and a volume which is determined on the basis of a required amount of lubricant.

3. A transmission according to claim 2, wherein the lubricant containment structure includes at least an oil tank, the oil tank is configured with:

a sidewall forming an outer shape of the oil tank;

wherein the partition wall divides an inside of the oil tank to form the plural portions, the plural portions including at least a first portion and a second portion, the first portion having the oil supply port and a bottom plate, the second portion having the auxiliary oil supply port and a bottom plate continuously formed with the bottom plate of the first portion, and the bottom plate of the first portion being sloped down from an end portion of the bottom plate of the first portion at which the bottom plate of the second portion is formed to an other end portion of the bottom plate of the first portion reaching the oil supply port.

4. A transmission according to claim 3, wherein a height of the partition wall is lower by a predetermined amount than a height of the sidewall.

5. A transmission according to claim 3, wherein the first portion includes a protrusion having an upper end opening in an upward direction.

6. A transmission according to claim 1, wherein the lubricant containment structure includes at least an oil tank, the oil tank is configured with:

a sidewall forming an outer shape of the oil tank;

wherein the partition wall divides an inside of the oil tank to form the plural portions, the plural portions including at least a first portion and a second portion, the first portion having the oil supply port and a bottom plate, the second portion having the auxiliary oil supply port and a bottom plate continuously formed with the bottom plate of the first portion, and the bottom plate of the first portion being sloped down from an end portion of the bottom plate of the first portion at which the bottom plate of the second portion is formed to an other end portion of the bottom plate of the first portion reaching the oil supply port.

7. A transmission according to claim 6, wherein a height of the wall is lower by a predetermined amount than a height of the sidewall.

8. A transmission according to claim 6, wherein the first portion includes a protrusion having an upper end opening in an upward direction.

9. A transmission according to claim 1, wherein the axis of the shaft defines a direction, the other of the plural portions being spaced from the one portion in said direction.

* * * * *